(12) United States Patent
Cho

(10) Patent No.: US 11,249,849 B2
(45) Date of Patent: Feb. 15, 2022

(54) MEMORY CONTROLLER AND METHOD OF OPERATING THE SAME

(71) Applicant: SK hynix Inc., Icheon-si (KR)

(72) Inventor: Young Ick Cho, Seoul (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 16/880,340

(22) Filed: May 21, 2020

(65) Prior Publication Data
US 2021/0073078 A1 Mar. 11, 2021

(30) Foreign Application Priority Data

Sep. 6, 2019 (KR) .......................... 10-2019-0110527

(51) Int. Cl.
| | |
|---|---|
| *G06F 12/00* | (2006.01) |
| *G06F 11/14* | (2006.01) |
| *G06F 11/30* | (2006.01) |
| *G06F 12/0882* | (2016.01) |
| *G06F 12/02* | (2006.01) |

(52) U.S. Cl.
CPC ...... *G06F 11/1435* (2013.01); *G06F 11/1451* (2013.01); *G06F 11/1461* (2013.01); *G06F 11/1469* (2013.01); *G06F 11/3037* (2013.01); *G06F 12/0246* (2013.01); *G06F 12/0882* (2013.01); *G06F 2212/7207* (2013.01)

(58) Field of Classification Search
None
See application file for complete search history.

(56) References Cited

U.S. PATENT DOCUMENTS

| | | | | |
|---|---|---|---|---|
| 2009/0248756 A1* | 10/2009 | Akidau | .............. | G06F 11/0727 |
| 2015/0081946 A1* | 3/2015 | Lecocq | .............. | G06F 11/1441 |
| | | | | 711/102 |
| 2015/0193335 A1* | 7/2015 | Woo | ...................... | G06F 9/5016 |
| | | | | 711/171 |
| 2016/0062883 A1* | 3/2016 | Byun | ................. | G06F 12/0246 |
| | | | | 711/103 |

FOREIGN PATENT DOCUMENTS

| | | |
|---|---|---|
| KR | 10-2014-0142124 A | 12/2014 |
| KR | 10-2018-0128588 A | 12/2018 |

* cited by examiner

*Primary Examiner* — Daniel D Tsui
(74) *Attorney, Agent, or Firm* — Perkins Coie LLP

(57) ABSTRACT

A memory controller configured to control a memory device may include: a metadata storage configured to store a plurality of metadata segments; a metadata updater configured to sequentially update the metadata segments; a backup data storage configured to store at least one original metadata segment (a metadata segment existing before being updated) among the metadata segments; a metadata backup circuit configured to store, before a selected metadata segment among the metadata segments is updated, an original metadata segment of the selected metadata segment in the backup data storage; and a metadata restorer configured to generate storage inhibit information indicating whether storing data in the memory device is inhibited based on a residual storage capacity of the memory device, and store, in the metadata storage, the original metadata segment stored in the backup data storage in response to the storage inhibit information while the metadata segments are updated.

18 Claims, 13 Drawing Sheets

METADATA STORAGE IN WHICH
ALL METADATA SEGMENTS HAVE
UPDATED STATE

METADATA STORAGE IN WHICH
SOME METADATA SEGMENT HAS
NON-UPDATED STATE

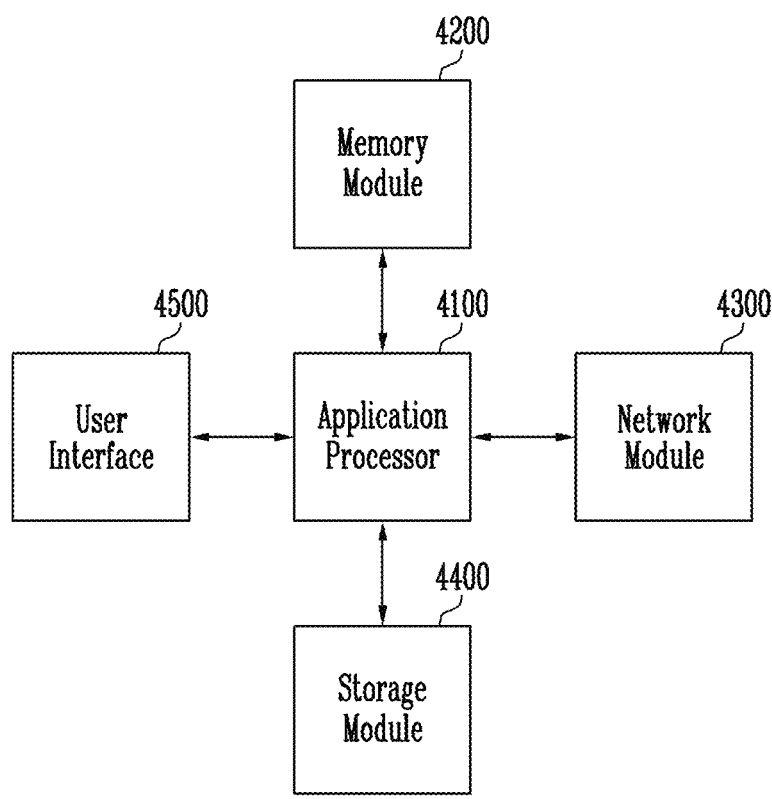

MEMORY CONTROLLER AND METHOD OF OPERATING THE SAME

CROSS-REFERENCE TO RELATED APPLICATION

This patent document claims priority to and benefits of the Korean patent application number 10-2019-0110527, filed on Sep. 6, 2019, which is incorporated herein by reference in its entirety.

TECHNICAL FIELD

Various embodiments of the disclosed technology generally relate to an electronic device including a memory controller and a method of operating the memory controller.

BACKGROUND

A storage device is a semiconductor device which stores data under control of a host device such as a computer or a smartphone. The storage device may include a memory device configured to store data, and a memory controller configured to control the memory device. Memory devices are generally classified into volatile memory devices and nonvolatile memory devices.

A volatile memory device is a memory device that can retain its data only when power is supplied thereto. Thus, such a volatile memory device loses its data in the absence of power. Examples of a volatile memory device include a static random access memory (SRAM), and a dynamic random access memory (DRAM).

A nonvolatile memory device is a memory device that can retain its data even in the absence of power. Examples of a nonvolatile memory device include a read-only memory (ROM), a programmable ROM (PROM), an electrically programmable ROM (EPROM), an electrically erasable programmable ROM (EEPROM), and a flash memory.

SUMMARY

Various embodiments of the disclosed technology relate to a memory controller having improved metadata management performance, and a method of operating the memory controller.

In one aspect, a memory controller configured to control a memory device is provided to include: a metadata storage configured to store a first metadata segment and a second metadata segment; a metadata updater communicatively coupled to the metadata storage and configured to transmit an indication to update the first metadata segment and update the first metadata segment stored in the metadata storage to an updated first metadata segment; a metadata backup circuit configured to receive from the metadata updater the indication and control copying of the first metadata segment in response to the indication; a backup data storage communicatively coupled to the metadata backup circuit and configured to store the first metadata segment based on the indication; and a metadata restorer configured to generate storage inhibit information indicating that storing data in the memory device is inhibited, and replace the updated first metadata segment stored in the backup data storage with the first metadata segment in response to the storage inhibit information.

In another aspect, a method is provided for operating a memory controller including a metadata storage configured to store a first metadata segment and a second metadata segment, and a backup data storage configured to store backup data of at least one of the first metadata segment or the second metadata segment. The method includes: storing, in response to a selection of the first metadata segment as being updated, the first metadata segment in the backup data storage; updating the first metadata segment to an updated first metadata segment such that the metadata storage stores the updated first metadata segment instead of the first metadata segment; and replacing, in response to storage inhibit information indicating that storing data in the memory device is inhibited, the updated first metadata segment stored in the metadata storage with the first metadata segment.

In another aspect, a memory controller is provided to include: a metadata storage configured to store a plurality of metadata segments; and a metadata restorer configured to back up a selected target segment to be updated among the plurality of metadata segments before the target segment is updated to an updated target segment, and restore the selected target segment instead of the updated target segment in the metadata storage based on a residual storage capacity of the memory device.

BRIEF DESCRIPTION OF THE DRAWINGS

FIG. 16 is an example of a block diagram illustrating a user system to which a storage device in accordance with an embodiment of the disclosed technology is applied.

DETAILED DESCRIPTION

Specific structural or functional descriptions in the embodiments of the disclosed technology introduced in this specification or application are only for description of the embodiments. The descriptions should not be construed as being limited to the embodiments described in the specification or application.

Various embodiments of the disclosed technology will now be described hereinafter with reference to the accompanying drawings.

Figure 1:
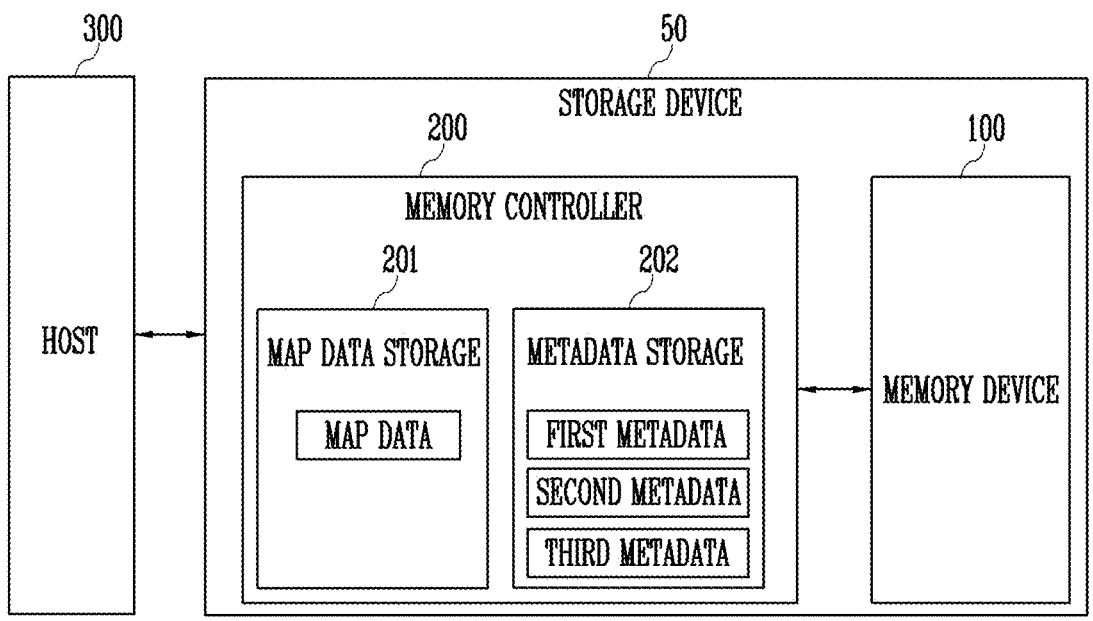
FIG. 1 is an example of a block diagram illustrating a storage device based on some implementations of the disclosed technology.

FIG. 1 is a block diagram illustrating an example of a storage device based on some implementations of the disclosed technology.

Referring to FIG. 1, the storage device 50 may include a memory device 100 and a memory controller 200 configured to control one or more operations of the memory device 100.

The storage device 50 may be configured to store and retrieve data according to requests from a host 300 such as a cellular phone, a smartphone, an MP3 player, a laptop computer, a desktop computer, a game machine, a TV, a tablet PC, or an in-vehicle infotainment system.

The storage device 50 may be implemented as any one of various kinds of storage devices depending on a host interface, which is a communication interface between the host 300 and the storage device 50. For example, the storage device 50 may be configured of any one of various kinds of storage devices such as an SSD, MMC, eMMC, RS-MMC, or micro-MMC type multimedia card, an SD, mini-SD, micro-SD type secure digital card, a universal serial bus (USB) storage device, a universal flash storage (UFS) device, a personal computer memory card international association (PCMCIA) card type storage device, a peripheral component interconnection (PCI) card type storage device, a PCI-express (PCI-E) type storage device, a compact flash (CF) card, a smart media card, or a memory stick.

The storage device 50 may be manufactured in the form of any one of various package types. For instance, the storage device 50 may be manufactured in the form of any one of various package types such as a package on package (POP) type, a system in package (SIP) type, a system on chip (SOC) type, a multi-chip package (MCP) type, a chip on board (COB) type, a wafer-level fabricated package (WFP) type, or a wafer-level stack package (WSP) type.

The memory device 100 may provide a storage space where data to be processed and/or instructions to be executed are stored. The memory device 100 may include the logic needed to read from and write to the memory device 100 and be operated under control of the memory controller 200. The memory device 100 may include a memory cell array including a plurality of memory cells which are configured to store data therein.

Each of the memory cells may be configured in various manners to store data. In some implementations, the memory cells can store a single bit or more bits of information. In some implementations, the memory cells may be implemented as a single level cell (SLC) capable of storing a single data bit, a multi-level cell (MLC) capable of storing two data bits, a triple-level cell (TLC) capable of storing three data bits, or a quad-level cell (QLC) capable of storing four data bits.

The memory cell array may include a plurality of memory blocks. Each memory block may include a plurality of pages, and each page corresponds to a plurality of memory cells. In an embodiment, read and program (write) operations are performed on a page basis, and erase operations are performed on a block basis.

In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory device, a resistive random access memory (RRAM), a phase-change memory (PRAM), a magnetoresistive random access memory (MRAM), a ferroelectric random access memory (FRAM), or a spin transfer torque random access memory (STT-RAM). In this patent document, for the sake of explanation, it is assumed that the memory device 100 is a NAND flash memory.

The memory controller 200 can access the memory device 100 based on request from the user/host by providing command/address signals to the memory controller 200. In some implementations, the memory device 100 is configured to receive, from the memory controller 200, a command and an address in which the command is performed or executed. The memory device 100 may access an area of the memory cell array that is selected by the received address. The memory device 100 which has accessed the selected area may perform an operation in the area identified by the address based on the received command requested by the user/host.

For example, the memory device 100 may perform a write (program) operation, a read operation, or an erase operation. During the program operation, data is written to the area (e.g., memory cell area) of the memory device 100, which is identified by the address. During the read operation, data is read from the area of the memory device 100, which is identified by the address. During the erase operation, data is erased from the area of the memory device 100, which is identified by the address.

The memory controller 200 may control the overall operation of the storage device 50.

When power is applied to the storage device 50, the memory controller 200 may execute firmware (FW). The firmware FW may include a host interface layer (HIL) configured to receive a request input from the host 300 or output a response to the host 300, a flash translation layer (FTL) configured to manage an operation between an interface of the host 300 and an interface of the memory device 100, and a flash interface layer (FIL) configured to provide a command to the memory device 100 or receive a response from the memory device 100. In an implementation, a flash translation layer (FTL) may be situated in the memory controller 200 to implement logical-to-physical mapping, garbage collection, wear leveling management, and bad block management. For example, the FTL may provide an interface between a host interface layer and a flash interface layer.

In an embodiment, the memory controller 200 may receive data and a logical address (LA) from the host 300, and translate the LA into a physical address (PA) indicating where in the memory device 100 the memory cells to write data to or read from are. The logical address may be a logical block address (LBA). The physical address may be a physical block address (PBA).

The memory controller 200 may control the memory device 100 to perform a program operation, a read operation, or an erase operation based on a request provided from the host 300. During the program operation, the memory controller 200 may provide a program command, a PBA, and data to the memory device 100. During the read operation, the memory controller 200 may provide a read command and a PBA to the memory device 100. During the erase operation, the memory controller 200 may provide an erase command and a PBA to the memory device 100.

In an embodiment, the memory controller 200 may autonomously control the memory device 100 to perform a program operation, a read operation, or an erase operation regardless of a request from the host 300. For example, the memory controller 200 may control the memory device 100 to perform a program operation, a read operation, or an erase operation which is used to perform background operations such as a wear leveling operation, a garbage collection operation, or a read reclaim operation. The term "garbage collection" as used herein may refer to a form of memory management, in which a garbage collector attempts to reclaim (garbage) memory that is occupied by objects that are no longer in use. The wear leveling indicates techniques for prolonging lifetime of erasable storage devices.

In an embodiment of the disclosed technology, the memory controller 200 may include a map data storage 201, and a metadata storage 202.

The map data storage 201 may store map data indicating a relationship between a logical address and a physical address. The map data storage 201 may be included in a nonvolatile memory device. For example, the map data storage 201 may be included in either a static random access memory (SRAM) or a dynamic random access memory (DRAM). Therefore, the memory controller 200 may store map data in the memory device 100 which is a nonvolatile memory device. When map data is updated, the memory controller 200 may perform a map update operation to store the updated map data in the memory device 100.

When power is supplied to the storage device 50, the memory controller 200 may read map data stored in the memory device 100 and store the read map data in the map data storage 201. The memory controller 200 may perform, using the map data, operations requested by the host 300.

In an embodiment, the memory controller 200 may load some of the map data from the memory device 100 to the map data storage 201.

When the logical address received from the host is not included in the map data stored in the map data storage 201, the memory controller 200 may load another map data from the memory device 100 to the map data storage 201.

The memory controller 200 may update the map data and store the updated map data in the memory device 100. The map data stored in the map data storage 201 may be updated based on a request from the host 300 or a background operation. For example, if the physical address corresponding to the logical address is changed through a background operation such as a garbage collection operation, a read reclaim operation, or a wear leveling operation, the memory controller 200 may store the updated map data in the memory device 100. If an unmap request for releasing the relationship between the logical address and the physical address is input from the host 300, the relationship between the logical address and the physical address may be released. When the relationship between the logical address and the physical address is released and the logical address does not have a corresponding physical address mapped, the memory controller 200 may assign a predetermined trim data as the physical address corresponding to the unmapped logical address. The memory controller 200 may control the memory device 100 to store the updated map data in the memory device 100.

The metadata storage 202 may store metadata. The metadata may be used to retain or maintain the performance or capabilities of the storage device 50. The metadata may be data related with the map data. The metadata may be changed as well as the map data is updated. For example, the metadata may include L1 map data that indicates a position where in the memory device 100 map data is stored, or L0 map data that indicates a position where in the memory device 100 the L1 map data is stored. In an embodiment, the metadata may include at least one of i) valid page bit map data indicating whether data stored in pages included in a memory block included in the memory device 100 is valid, ii) valid page count data indicating the number of valid page included in the memory block included in the memory device, or iii) group block address data indicating physical addresses of memory blocks that form a super block.

In an embodiment, the metadata may include at least one of read count data which is information about the number of read requests transmitted to a memory block included in the memory device 100, an erase count data which is information about the number of erase operations performed on the memory block, or hot/cold metadata indicating whether stored data is hot data or cold data.

The metadata may be stored in the memory device 100. The memory controller 200 may update the metadata and store the updated metadata in the memory device 100.

If power is applied to the storage device 50, the memory controller 200 may load the metadata from the memory device 100 to the metadata storage 202. The memory controller 200 may mange the performance or capabilities of the memory device 100 using the metadata.

Updating the map data may cause updating of the metadata. Thus, if the map data is updated, the metadata may be updated based on a relationship between a logical address and a physical address, the relationship being indicated by the updated map data. For example, when a physical address corresponding to a logical address is changed, at least one among valid page bit map data, valid page count data, group block address data, read count data, erase count data, or hot cold metadata, which can be included in the metadata, may be updated.

Alternatively, when the updated map data is stored in the memory device 100, the L1 map data or the L0 map data may be updated depending on a position wherein in the memory device 100 the updated map data is stored.

In an embodiment, the metadata storage 202 may be included in a volatile memory device. For example, the metadata storage 202 may be storage space included in the volatile memory device. For example, the metadata storage 202 may be included in either a static random access memory (SRAM) or a dynamic random access memory (DRAM). Therefore, the memory controller 200 may store map data in the memory device 100 which is a nonvolatile memory device.

The host 300 may communicate with the storage device 50 using at least one of various communication methods such as universal serial bus (USB), serial AT attachment (SATA), serial attached SCSI (SAS), high speed interchip (HSIC), small computer system interface (SCSI), peripheral component interconnection (PCI), PCI express (PCIe), nonvolatile memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM) communication methods.

Figure 2:
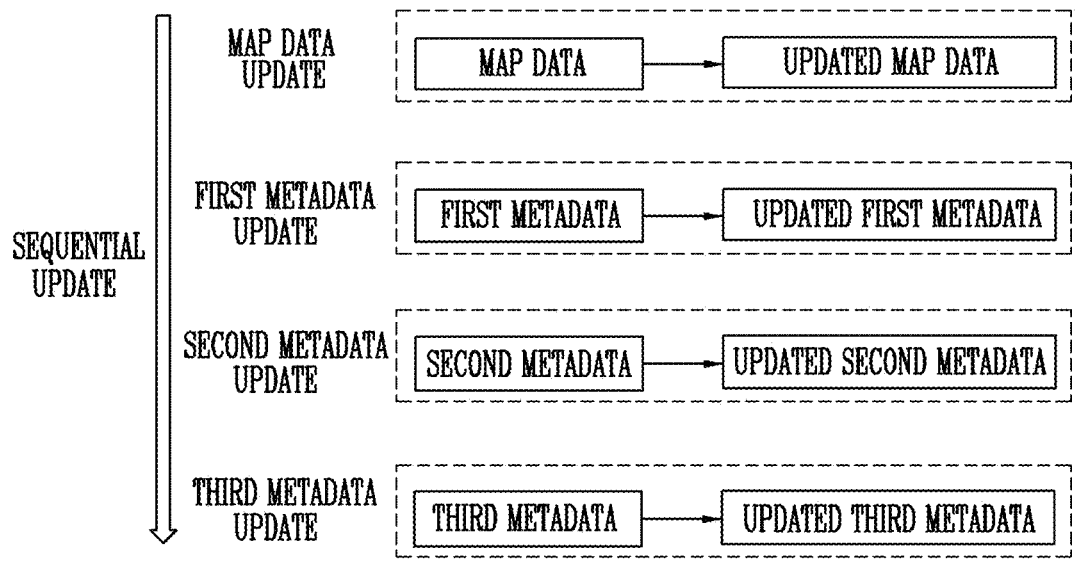
FIG. 2 is an example of a diagram for illustrating an operation of updating map data and metadata based on some implementations of the disclosed technology.

FIG. 2 is a diagram illustrating an operation of updating map data and metadata.

Referring to FIG. 2, the memory controller 200 may update map data stored in the map data storage 201. The memory controller 200 may store the updated map data in the memory device 100. The memory controller 200 may update the metadata after the map data has been updated or the updated map data has been stored in the memory device.

The memory controller 200 may sequentially update a plurality of pieces of metadata. For example, first metadata, second metadata, and third metadata may be sequentially updated.

In an embodiment, metadata to be subsequently updated may be updated after preceding updated metadata has been stored in the memory device 100. For example, the second metadata may be updated after the first metadata has been stored in the memory device 100. The third metadata may be updated after the second metadata has been stored in the memory device 100.

In an embodiment, the first metadata, the second metadata, and the third metadata may be updated based on the updated map data. The first metadata, the second metadata, and the third metadata each may be data which is changed depending on updating the map data. For example, the metadata may include at least one of i) L1 map data indicating a position at which the map data is stored in the memory device 100, ii) L0 map data indicating a position at which the L1 map data is stored in the memory device 100, iii) valid page bit map data indicating whether data stored in pages included in a memory block included in the memory device 100 is valid, iv) valid page count data indicating the number of valid pages included in the memory block included in the memory device 100, v) group block address data indicating physical addresses of memory blocks that form a super block, vi) read count data that is information about the number of read requests transmitted to the memory block included in the memory device 100, vii) erase count data that is information about the number of erase operations performed on the memory block, or viii) hot/cold metadata indicating whether the stored data is hot data or cold data. In an embodiment, the first metadata, the second metadata, and the third metadata may be updated based on a position of an area in which the updated map data is stored in the memory device 100. For example, the first metadata may be L1 map data indicating a position at which the map data is stored in the memory device 100. The second metadata may be L0 map data indicating a position at which the L1 map data is stored in the memory device 100.

In an embodiment, the first metadata, the second metadata, and the third metadata may be different from one another.

Figure 3:
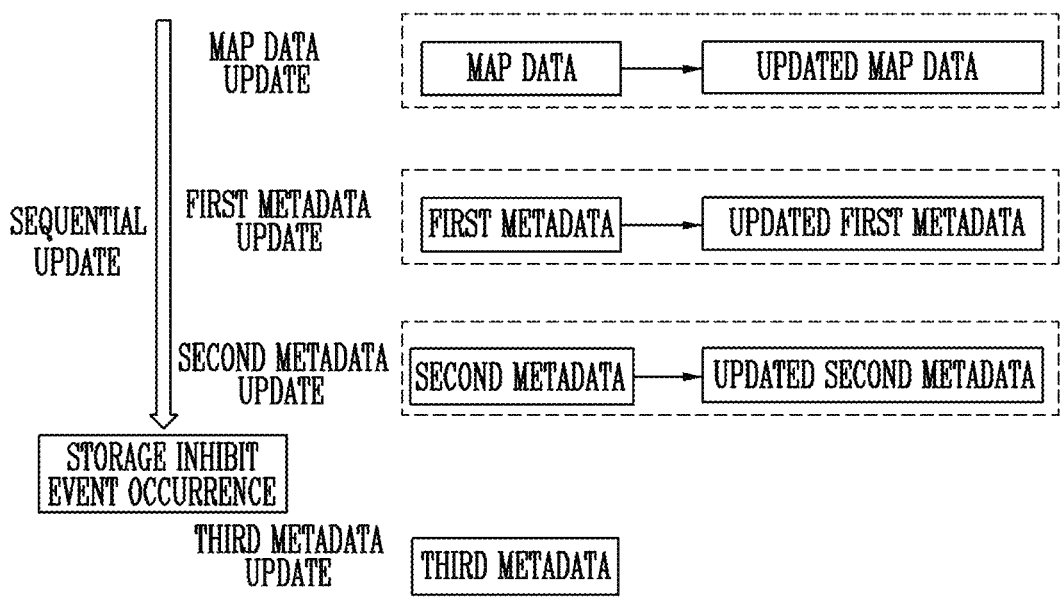
FIG. 3 is an example of a diagram illustrating a case where only some of metadata is updated.

FIG. 3 is a diagram illustrating a case where only some of metadata is updated.

Referring to FIG. 3, after the first metadata and the second metadata are sequentially updated, storing data in the memory device 100 may be inhibited. The case where storing data in the memory device is inhibited may include the case where the capacity with which data can be stored in the memory device 100 is a reference value or less, the case where the memory controller 200 receives a storage inhibit signal from the memory device 100, or the case where the memory controller 200 receives a storage inhibit command from the host.

In an embodiment, metadata to be subsequently updated may be updated after previously updated metadata has been stored in the memory device 100. For example, the second metadata may be updated after the first metadata has been stored in the memory device 100. The third metadata may be updated after the second metadata has been stored in the memory device 100.

Therefore, when a storage operation is inhibited, at least one of the first metadata, the second metadata, and the third metadata may not be updated. For example, when a data storage inhibit event occurs after the updated first metadata and the updated second metadata have been stored in the memory device 100, the third metadata cannot be stored in the memory device 100 even if the third metadata is updated. Hence, the memory controller 200 may not update the third metadata.

Because the third metadata is not updated, the updating operation may be suspended when the updated first metadata, the updated second metadata, and the third metadata have been stored in the metadata storage 202. Since the memory controller 200 performs, using metadata stored in the metadata storage 202, an operation corresponding to a request from the host or a background operation, the operation or the background operation may be abnormally performed if only some of metadata has been updated.

Figure 4A:
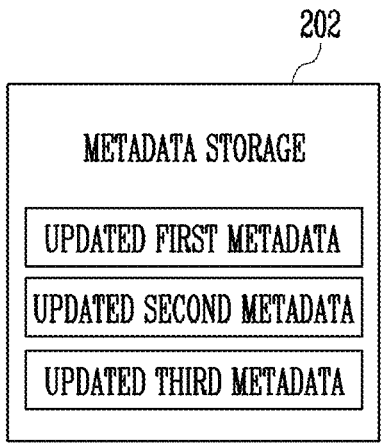
FIGS. 4A and 4B are examples of diagrams showing two cases where metadata is stored in a metadata storage.
Figure 4B:
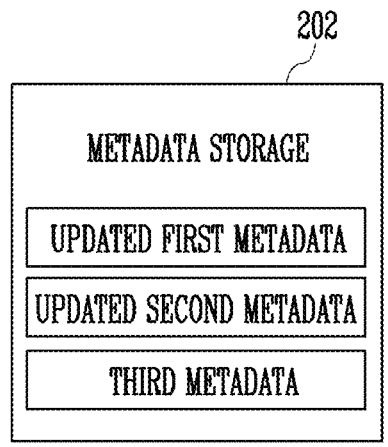

FIGS. 4A and 4B are diagram showing two cases where metadata is stored in a metadata storage.

Referring to FIG. 4A where all metadata has been updated, updated first metadata, updated second metadata, and updated third metadata may be stored in the metadata storage 202.

In FIG. 4B, the first metadata and the second metadata have been updated but the third metadata has not been updated. Thus, the updated first metadata, the updated second metadata, and the third metadata may be stored in the metadata storage 202.

The updated first metadata and the updated second metadata may be related with updated map data. The third metadata may be related with original map data (previous map data existing before the update). Therefore, in the case where the memory controller 200 performs, using metadata stored in the metadata storage 202, an operation corresponding to a request from the host or a background operation, the operation or the background operation may be abnormally performed.

Figure 5:
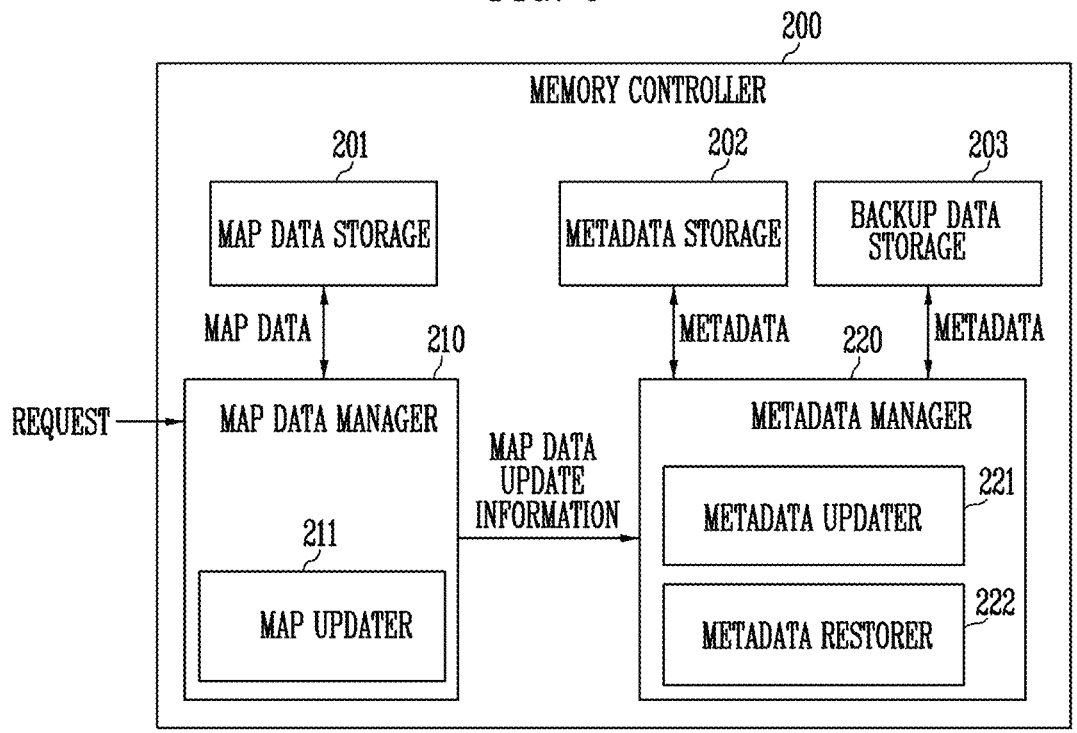
FIG. 5 is an example of a block diagram illustrating a memory controller based on some implementations of the disclosed technology.

FIG. 5 is a block diagram for describing the memory controller 200 in accordance with an embodiment.

Referring to FIG. 5, the memory controller 200 may include a map data manager 210, a metadata manager 220, a map data storage 201, a metadata storage 202, and a backup data storage 203.

The map data manager 210 may receive a request from the host 300 and transmit map data update information to the metadata manager 220. The map data update information may be or include information indicating that map data stored in the map data storage 201 is updated, or information indicating that the updated map data is stored in the memory device 100. The map data update information may include an updated relationship between a logical address and a physical address, and/or a position information at which the updated map data is stored in the memory device 100.

The map data manager 210 may include a map updater 211. The map updater 211 may update map data stored in the map data storage 201, based on a request from the host 300 or a background operation. For example, if data stored in a first area indicated by a logical address is transferred to a second area through a background operation, the map updater 211 may update the map data so that the logical address corresponds to a physical address of the second area. Alternatively, if an unmap request for releasing the relationship between the logical address and the physical address is input or received from the host 300, the relationship between the logical address and the physical address may be released.

The metadata manager 220 may include a metadata updater 221 and a metadata restorer 222. The metadata manager 220 may receive map data update information from the map data manager 210 and manage the metadata.

In some implementations, the metadata updater 221 may update metadata stored in the metadata storage 202 based on the updated map data. The metadata updater 221 may control the memory device 100 to store the updated metadata in the memory device 100. The metadata restorer 222 may back up metadata to be updated in the backup data storage 203. For example, among first to third metadata stored in the metadata storage 202, a first metadata is to be updated to an updated first metadata, the metadata restorer 222 may store the first metadata in the backup data storage 203. The metadata restorer 222 may sense or detect an event in which an operation of storing data in the memory device 100 is inhibited, and restore the metadata backed up in the backup data storage 203 to the metadata storage 202 in the case of the event. For example, when the event that storing data in the memory device 100 is habited, the metadata restorer 222 controls the metadata storage 202 which already stores the updated first metadata instead of the first metadata to replace the updated first metadata with the first metadata that existed in the metadata storage 202 before the update of the first metadata.

The backup data storage 203 may be or include a memory which is used to store original metadata existing before being updated. The backup data storage 203 may be a storage space included in a nonvolatile memory device. For example, the backup data storage 203 may be included in either a static random access memory (SRAM) or a dynamic random access memory (DRAM).

Figure 6:
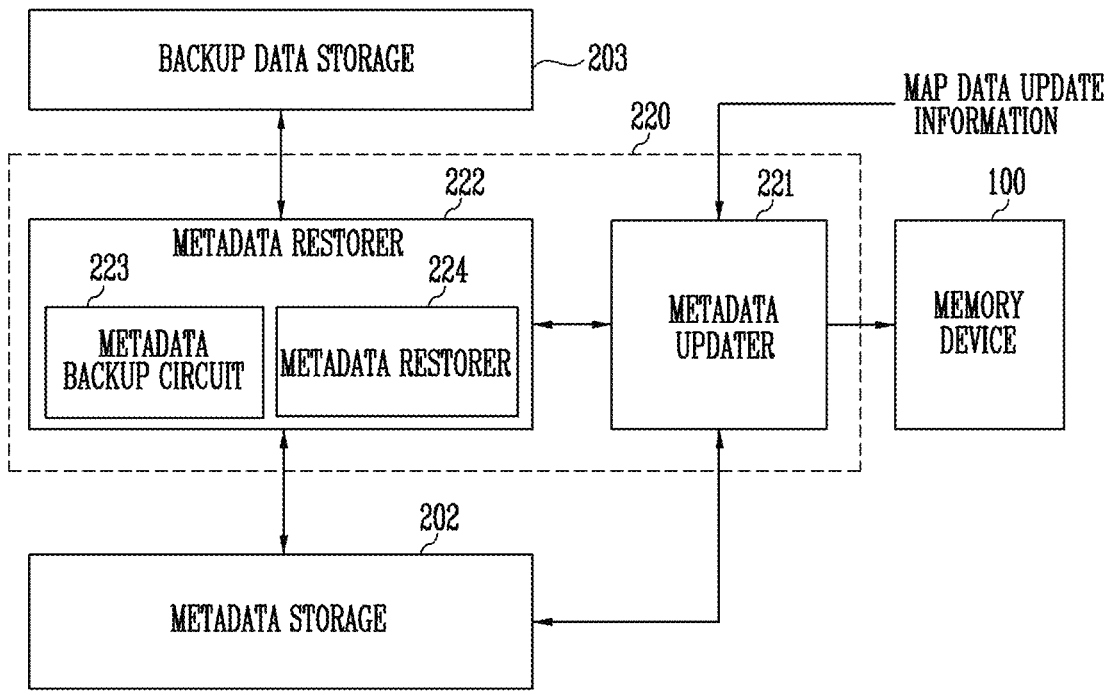
FIG. 6 is an example of a block diagram illustrating a metadata manager based on some implementations of the disclosed technology.

FIG. 6 is a block diagram illustrating metadata manager 220.

Referring to FIG. 6, the first metadata, the second metadata, and the third metadata may be stored in the metadata storage 202. The metadata updater 221 may receive map data update information from the map data manager 210, and update the metadata stored in the metadata storage 202 based on the updated map data. For example, the metadata updater 221 may load metadata stored in the metadata storage 202 on a buffer (not illustrated) included in the metadata updater 221, update the metadata based on the updated map data, and store the updated metadata in the metadata storage 202. The metadata updater 221 may sequentially update metadata stored in the metadata storage 202. For example, the metadata updater 221 may first update the first metadata among the first metadata, the second metadata, and the third metadata. The metadata updater 221 may transmit update start information to the metadata restorer 222 before the first metadata is updated. The update start information may include information indicating a position at which the first metadata is stored in the metadata storage 202. The metadata updater 221 may store the updated first metadata in the memory device 100.

The metadata restorer 222 may receive the update start information and back up the first metadata. For example, a metadata backup circuit 223 may back up the first metadata from the metadata storage 202 in the backup data storage 203, based on the information indicating the position at which the first metadata is stored in the metadata storage 202.

The metadata updater 221 may transmit update complete information to the metadata restorer 222 after the metadata has been updated. As the result of the completion of the update that is performed for the first metadata among first to third metadata, the metadata storage 202 stores an updated first metadata instead of the first metadata. The update complete information may include information indicating that updating the metadata has been completed. The update complete information may include information that the metadata has been stored in the memory device 100.

The metadata restorer 222 may receive the update complete information and restore the metadata. For example, the metadata restorer 224 may sense an event in which storing data in the memory device 100 is inhibited, and generate storage inhibit information in response to the sensing of such event. The metadata restorer 224 may restore the metadata stored in the backup data storage 203 to the metadata storage 202 in response to the storage inhibit information. For example, the metadata restorer 224 may restore the first metadata stored in the backup data storage 203 to the metadata storage 202 in response to the storage inhibit information. As the result of the restoration, the metadata storage 202 stores the first metadata instead of the updated first metadata.

The storage inhibit information may include information indicating that the memory device is used only for read. The storage inhibit information may include information indicating that the storage capacity with which data is stored in the memory device 100 is a reference value or less, information indicating that the memory controller 200 has received the storage inhibit signal from the memory device 100, or information indicating that the memory controller 200 has received a storage inhibit command from the host. In an embodiment, the metadata restorer 224 may generate storage inhibit information when the number of free blocks in the memory device 100 is a threshold number or less.

When the metadata restorer 224 senses the event in which the storing data in the memory device 100 is inhibited, the metadata restorer 224 may transmit storage inhibit information to the metadata updater 221. The metadata updater 221 may receive storage inhibit information and suspend updating the metadata. For example, an operation of updating the second metadata and the third metadata that have not been updated yet but been stored in the metadata storage 202 may be suspended.

The metadata restorer 224 may generate update continue information based on a result of the sensing that indicates that storing data in the memory device 100 is not inhibited, and transmit the update continue information to the metadata updater 221. The update continue information may include information indicating that the operation of updating metadata that has not yet been updated among the metadata stored in the metadata storage 202 needs to be continuously performed.

The metadata updater 221 may receive the update continue information, and update metadata that has not yet been updated among the metadata stored in the metadata storage 202. For example, since the first metadata stored in the metadata storage 202 has been updated, the second metadata that has not been updated may be updated.

The metadata updater 221 may transmit update start information to the metadata restorer 222 before the second metadata is updated.

The metadata backup circuit 223 may back up the second metadata stored in the metadata storage 202 to the backup data storage 203, in the same manner as that of the operation of backing up the first metadata.

The metadata updater 221 may transmit update complete information to the metadata restorer 222 after the second metadata has been updated. As the result of the completion of the update that is performed for the second metadata, the metadata storage 202 stores an updated second metadata instead of the second metadata.

The metadata restorer 224 that has received the update complete information may sense an event in which storing data in the memory device 100 is inhibited, and generate storage inhibit information in response to the sensing of such event. The metadata restorer 224 may restore the metadata stored in the backup data storage 203 to the metadata storage 202 in response to the storage inhibit information. For example, the metadata restorer 224 may restore the first metadata and the second metadata stored in the backup data storage 203 to the metadata storage 202 in response to the storage inhibit information. As the result of the restoration, the metadata storage 202 stores the second metadata instead of the updated second metadata.

Since the updated metadata stored in the metadata storage 202 is restored to the original metadata (the metadata exiting before being updated), an event in which only some of the metadata stored in the metadata storage 202 is updated can be prevented from occurring.

Figure 7:
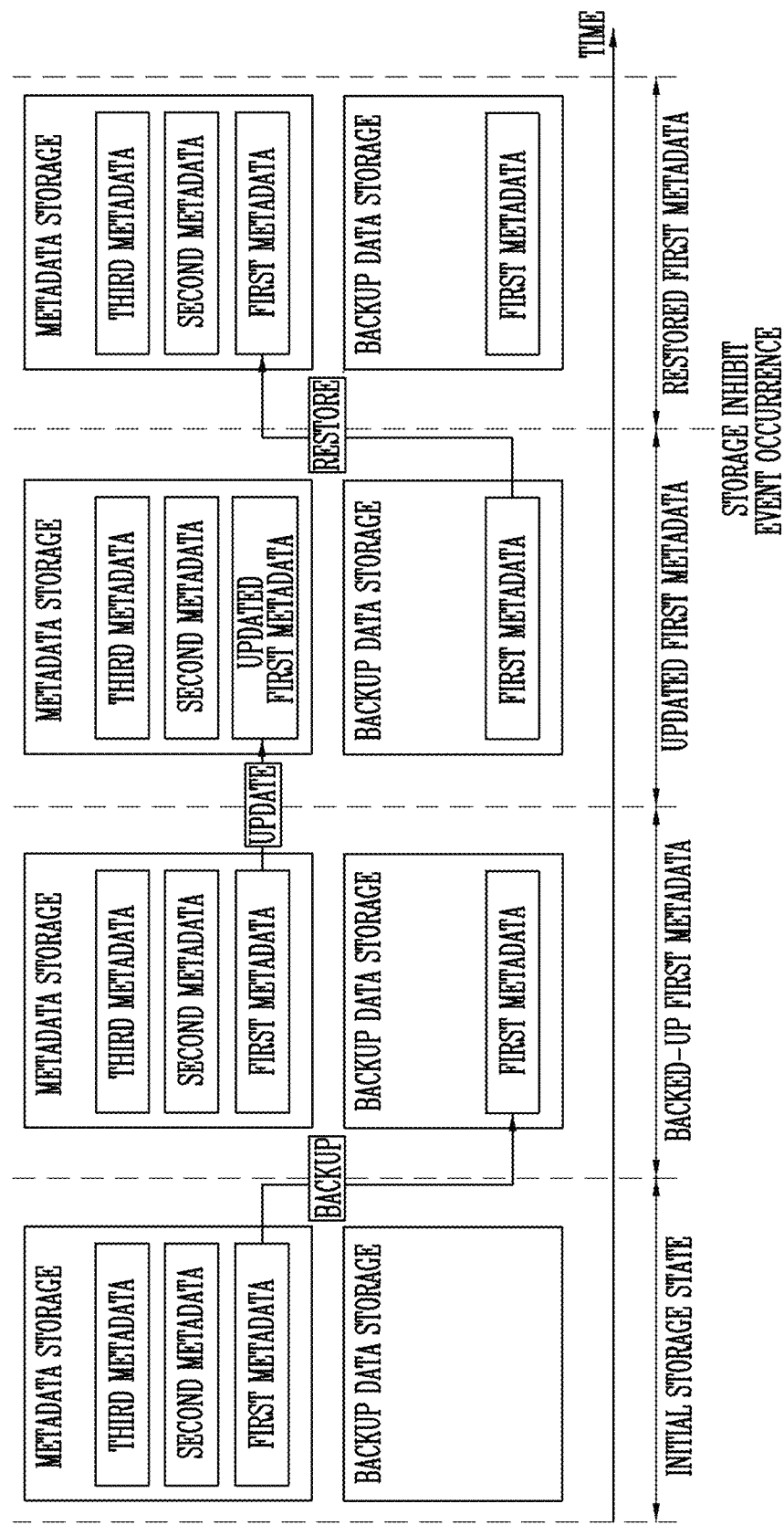
FIG. 7 is an example of a diagram illustrating a process of restoring first metadata based on some implementations of the disclosed technology.

FIG. 7 is a diagram for describing a process of restoring the first metadata.

Referring to FIG. 7, before the metadata is updated, the first metadata, the second metadata, and the third metadata may be stored in the metadata storage 202, and no metadata may be stored in the backup data storage 203. Although for the sake of explanation, FIG. 7 shows only three metadata stored in the metadata storage 202, the number of stored metadata can be changed.

The metadata backup circuit 223 may back up the first metadata stored in the metadata storage 202 to the backup data storage 203 in response to the update start information received form the metadata updater 221. After the first metadata has been backed up, the metadata storage 202 stores the first metadata, the second metadata, and the third metadata, and the backup data storage stores the first metadata.

The metadata updater 221 may update the first metadata stored in the metadata storage 202 based on the updated map data. The metadata updater 221 may store the updated first metadata in the memory device 100. After the first metadata has been updated, the metadata storage 202 stores the updated first metadata, the second metadata, and the third metadata, and the backup data storage 203 stores the first metadata.

After the update complete information has been received from the metadata updater 221, the metadata restorer 224 may sense an event in which storing data in the memory device 100 is inhibited, and generate storage inhibit information in response to the sensing of the event.

For example, the metadata restorer 224 may sense an event in which the number of free blocks included in the memory device 100 is a threshold number or more, an event in which the memory controller 200 receives a storage inhibit signal from the memory device 100, or an event in which the memory controller 200 receives a storage inhibit command from the host. The metadata restorer 224 may transmit the storage inhibit information to the metadata updater 221.

In response to the storage inhibit information, the metadata restorer 224 may restore the updated first metadata stored in the metadata storage 202 to the first metadata using the first metadata backed up in the backup data storage 203. After the first metadata has been restored, the metadata storage 202 stores the first metadata, the second metadata, and the third metadata, and the backup data storage 203 stores the first metadata.

By the restoration of the updated metadata to the original metadata that existed before the update, the problem in which only some of the metadata stored in the metadata storage 202 is updated while some other of the metadata stored in the metadata storage 200 is not updated can be solved. Thus, the memory controller 200 may normally perform an operation corresponding to a request from the host or a background operation.

Figure 8:
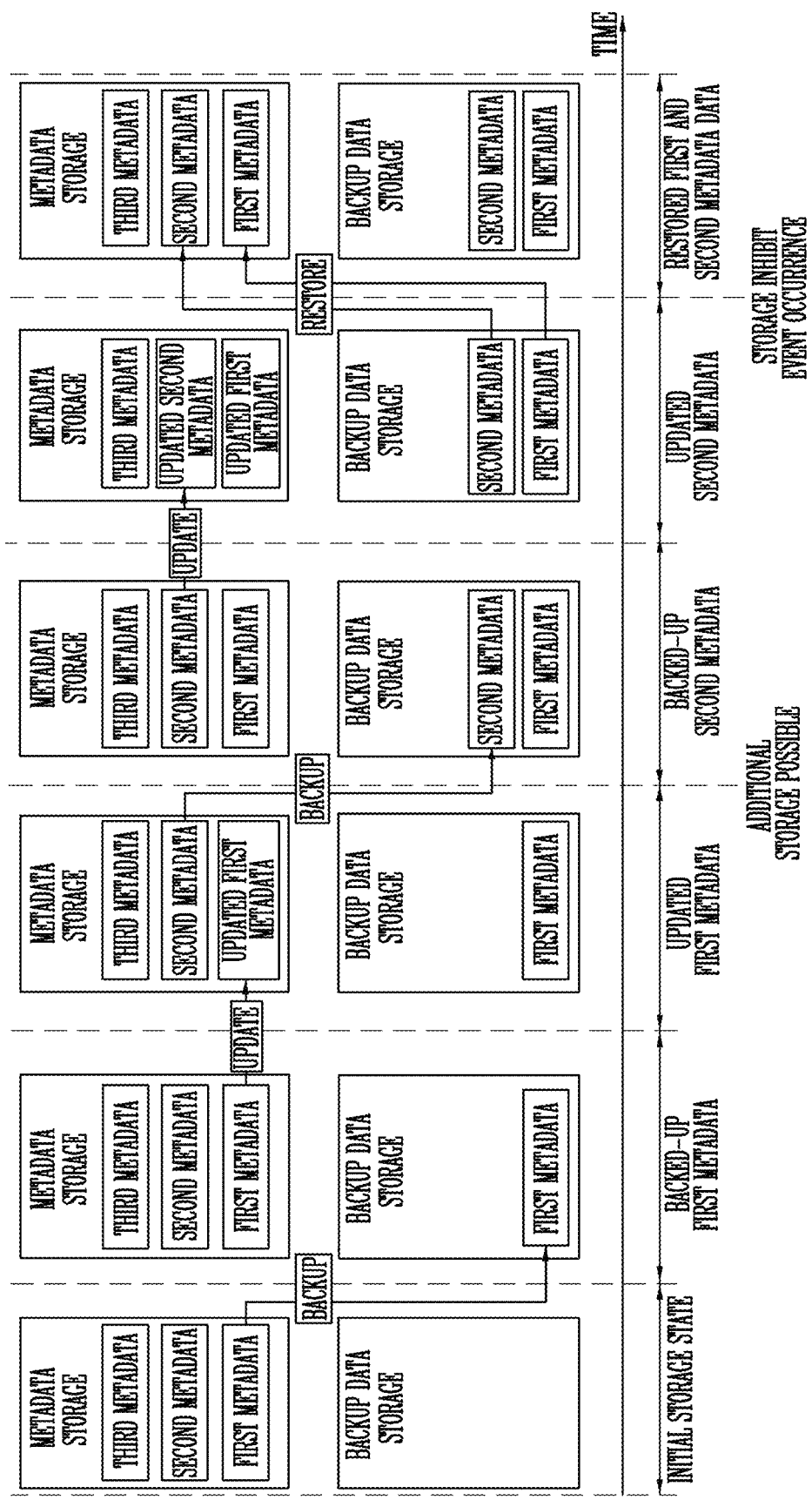
FIG. 8 is an example of a diagram illustrating a process of restoring first metadata and second metadata based on some implementations of the disclosed technology.

FIG. 8 is a diagram for describing a process of restoring the first metadata and the second metadata.

Referring to FIG. 8, the metadata updater 22 may update the first metadata and the second metadata. The process of updating the first metadata will be omitted because it has been described with reference to FIG. 7. Hereinafter, a process of updating the second metadata will be described.

The metadata restorer 224 that receives update complete information from the metadata updater 221 that has updated the first metadata may sense an event in which storing data in the memory device 100 is inhibited. The metadata restorer 224 may generate update continue information based on a result of the sensing. The update continue information may include information indicating that the operation of updating metadata that has not yet been updated among the metadata stored in the metadata storage 202 needs to be continuously performed. The update continue information may include information indicating that additional data can be stored in the memory device 100. The metadata restorer 224 may transmit update continue information to the metadata updater 221.

The metadata updater 221 may receive the update continue information, and update metadata that has not yet been updated among the metadata stored in the metadata storage 202. For example, the second metadata that has not been updated among the metadata stored in the metadata storage 202 may be updated based on the updated map data. The metadata updater 221 may update the second metadata and transmit update complete information to the metadata restorer 222. As the result of the completion of the update of the second metadata, the metadata updater 221 may store the updated second metadata in the memory device 100. After the second metadata has been updated, the metadata storage 202 stores the updated first metadata, the updated second metadata, and the third metadata and the backup data storage 203 stores the first metadata and the second metadata.

In response to the update complete information received from the metadata updater 221, the metadata restorer 224 may sense an event in which storing data in the memory device 100 is inhibited, and generate storage inhibit information depending on a result of the sensing.

For example, the metadata restorer 224 may sense an event in which the number of free blocks included in the memory device 100 is a threshold number or more, an event in which the memory controller 200 receives a storage inhibit signal from the memory device 100, or an event in which the memory controller 200 receives a storage inhibit command from the host. The metadata restorer 224 may transmit the storage inhibit information to the metadata updater 221.

In response to the storage inhibit information, the metadata restorer 224 may restore the updated first metadata and the updated second metadata stored in the metadata storage 202 to the first metadata and the second metadata, respectively, using the first metadata and the second metadata backed up in the backup data storage 203. After the first metadata and the second metadata have been restored, the metadata storage 202 stores the first metadata, the second metadata, and the third metadata may be in a state of having been stored in, and the backup data storage 203 stores the first metadata and the second metadata.

Since the problem in which only some of the metadata stored in the metadata storage 202 is updated can be solved by the restoration, the memory controller 200 may normally perform an operation corresponding to a request from the host or a background operation.

Figure 9:
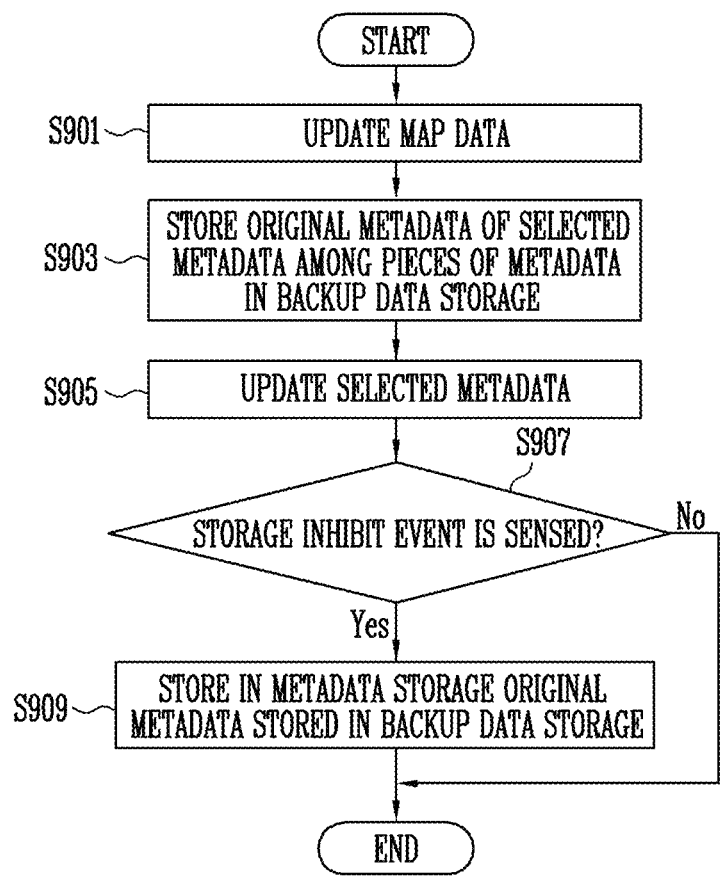
FIG. 9 is an example of a flowchart illustrating an operation of updating selected metadata performed by a memory controller based on some implementations of the disclosed technology.

FIG. 9 is a flowchart illustrating an operation of updating, by the memory controller, selected metadata.

Referring to FIG. 9, at step S901, the memory controller may update map data. The memory controller 200 may update a relationship between a logical address and a physical address, the relationship being indicated by the map data, based on a request from the host or a background operation.

At step S903, the memory controller 200 may store, in the backup data storage 203, original metadata of selected metadata among pieces of metadata. For example, the memory controller 200 may store, in the backup data storage 203, the first metadata among the first metadata, the second metadata, and the third metadata that are stored in the metadata storage 202.

At step S905, the memory controller 200 may update the selected metadata. The memory controller 200 may update the selected metadata based on the updated map data. For example, the memory controller 200 may update the first metadata based on the updated map data.

At step S907, the memory controller 200 may sense an event in which storing data in the memory device 100 is inhibited. For example, the memory controller 200 may sense an event in which the number of free blocks included in the memory device 100 is a threshold number or more, an event in which the memory controller 200 receives a storage inhibit signal from the memory device 100, or an event in which the memory controller 200 receives a storage inhibit command from the host, and may generate storage inhibit information based on a result of the sensing.

At step S909, the memory controller 200 may store the original metadata (the metadata existing before being updated) stored in the backup data storage 203 in the metadata storage 202. For example, in response to the storage inhibit information, the memory controller 200 may restore the updated first metadata stored in the metadata storage 202 to the first metadata using the first metadata backed up in the backup data storage 203.

Figure 10:
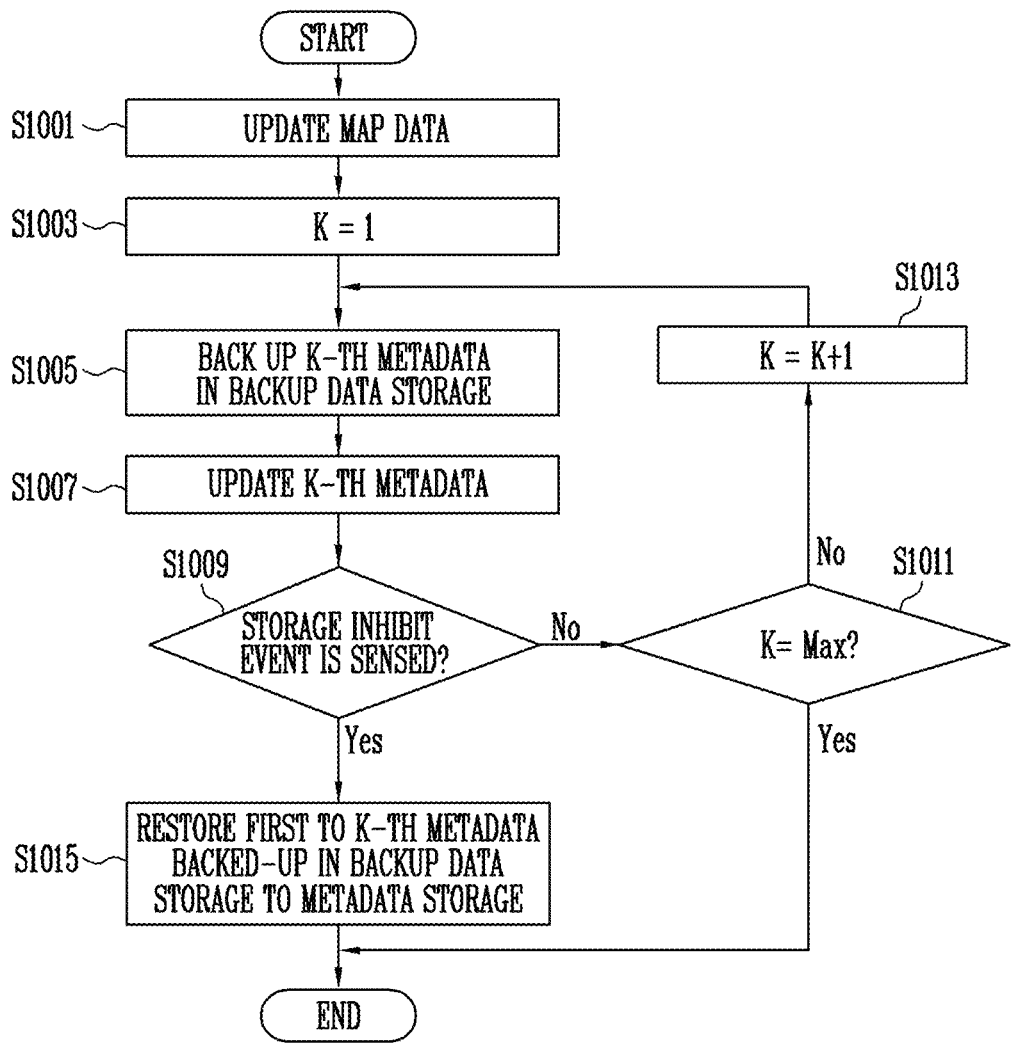
FIG. 10 is an example of a flowchart illustrating an operation of updating metadata performed by a memory controller based on some implementations of the disclosed technology.

FIG. 10 is a flowchart illustrating an operation of updating metadata by the memory controller 200.

Referring to FIG. 10, at step S1001, the memory controller 200 may update map data stored in the map data storage. The memory controller 200 may store the updated map data in the memory device 100.

The memory controller 200 may sequentially update Max pieces of metadata based on the updated map data, wherein Max is a natural number indicating a number of metadata to be updated. At step S1003, the memory controller 200 may set K to 1 (i.e., K=1) and first update the first metadata.

At step S1005, the memory controller 200 may back up the first metadata in the backup data storage 203. The memory controller 200 may back up the original first metadata in the backup data storage 203 before updating the first metadata. The original first metadata corresponds to the first metadata before the update of the first metadata.

At step S1007, the memory controller 200 may update the first metadata based on the updated map data. In an embodiment, the memory controller 200 may update the first metadata based on a position of an area in which the updated map data is stored in the memory device 100. The memory controller 200 may store the updated first metadata in the memory device 100.

At step S1009, the memory controller 200 may sense an event in which storing data in the memory device 100 is inhibited. For example, the memory controller 200 may sense an event in which the number of free blocks included in the memory device 100 is a threshold number or more, an event in which the memory controller 200 receives a storage inhibit signal from the memory device 100, or an event in which the memory controller 200 receives a storage inhibit command from the host, and may generate storage inhibit information or update continue information based on a result of the sensing.

For example, if an event in which the number of free blocks included in the memory device 100 is a threshold number or more, an event in which the memory controller 200 receives a storage inhibit signal from the memory device 100, or an event in which the memory controller 200 receives a storage inhibit command from the host is sensed, storage inhibit information may be generated. The update continue information may include information indicating that the operation of updating metadata that has not yet been updated among the metadata stored in the metadata storage 202 is required to be continuously performed. The update continue information may include information indicating that additional data can be stored in the memory device 100.

The memory controller 200 may perform step S1015 in response to the storage inhibit information, and perform step S1011 in response to the update continue information.

At step S1015, the memory controller 200 may restore the first metadata backed up in the backup data storage 203 to the metadata storage 202. The memory controller 200 may restore the first metadata in response to the storage inhibit information, and suspend updating the second metadata and the third metadata that have not yet been updated among pieces of metadata stored in the metadata storage 202. Thus, the metadata storage 202 stores the first metadata (instead of the updated first metadata), the second metadata and the third metadata.

At step S1011, the memory controller 200 may determine whether the updated metadata is last metadata to be updated. For example, the memory controller 200 may determine whether the currently updated metadata is a Max-th metadata. If the currently updated metadata is not the Max-th metadata, the memory controller 200 increases K by 1 at step S1013. Therefore, at step S1005, the second metadata that is metadata to be updated in a subsequent turn may be backed up to the backup data storage 202

Steps S1005 to S1009 for the second metadata are the same as steps S1005 and S1009 for the first metadata; therefore repetitive explanation thereof will be omitted.

At step S1015 for the second metadata, the memory controller 200 may restore the first and the second metadata backed up in the backup data storage 203 to the metadata storage, in response to the storage inhibit information. The memory controller 200 may restore the first metadata and the second metadata in response to the storage inhibit information, and suspend updating the third metadata that has not yet been updated among the pieces of metadata stored in the metadata storage 202. Thus, the metadata storage 202 stores the first metadata (instead of the updated first metadata), the second metadata (instead of the updated second metadata), and the third metadata.

At step S1011 for the second metadata, the memory controller 200 may determine whether the second metadata is last metadata to be updated. For example, the memory controller 200 may determine whether the second metadata is the Max-th metadata.

In the case where the second metadata is the Max-th metadata, the operation of updating the metadata may be terminated. In the case where the second metadata is not the Max-th metadata, the memory controller 200 may increase K by 1, at step S1013. At step S1005, the memory controller 200 may back up, in the backup data storage 203, the third metadata that is metadata to be subsequently updated Since the problem in which only some of the metadata stored in the metadata storage 202 is updated may be solved by the restoration, the memory controller 200 may normally perform an operation corresponding to a request from the host or a background operation.

Figure 11:
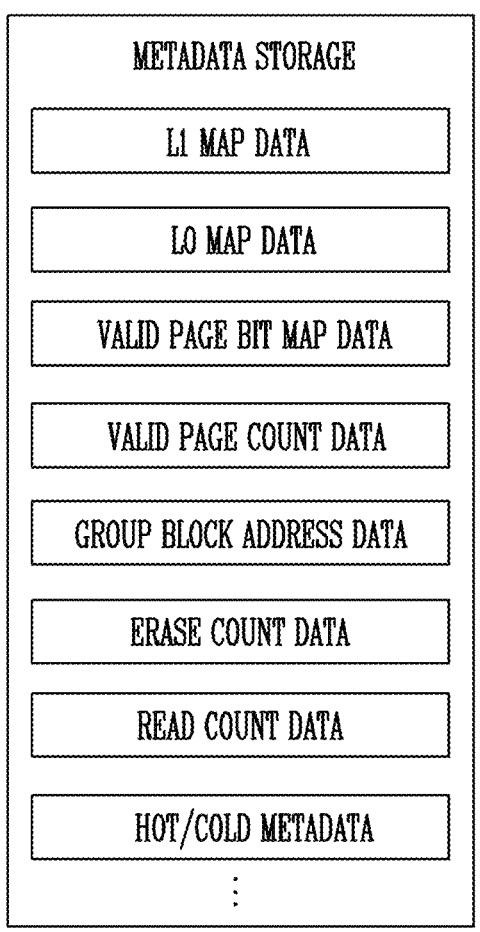
FIG. 11 is an example of a diagram showing a type of metadata based on some implementations of the disclosed technology.

FIG. 11 is a diagram for describing the type of metadata.

Referring to FIG. 11, the metadata may include at least one among L1 map data, L0 map data, valid page bitmap data, valid page count data, group block address data, erase count data, read count data, or hot cold metadata. The metadata stored in the metadata storage 202 may be stored in the memory device 100.

The L1 map data may include information indicating a position at which the map data is stored in the memory device 100. For example, in the case where the map data is dispersed and stored in the memory device 100, the L1 map data may include physical addresses of dispersed areas.

The L0 map data may include information indicating a position at which the L1 map data is stored in the memory device 100. The L0 map data may be generated based on the L1 map data.

The valid page bit map data may indicate whether data stored in pages included in a memory block included in the memory device 100 is valid. For example, a page in which valid data is stored may be bit map data indicated as 1, and a page in which invalid data is stored may be bit map data indicated as 0.

The valid page count data may indicate the number of valid pages included in a memory block included in the memory device 100. For example, the valid page count data may indicate the number of valid pages among pages corresponding to respective physical block addresses (PBAs).

Alternatively, the valid page count data may indicate the number of valid pages among pages corresponding to respective logical block addresses (LBAs). The valid page count data may be generated based on the valid page bit map data.

The group block address data may include information indicating physical addresses of memory blocks that form a super block. For example, the group block address may include information indicating respective physical addresses of memory blocks that are disposed in different planes included in the memory device 100.

The erase count data may be information about the number of times erase operations have been performed in a memory block included in the memory device 100. For instance, in the case where data stored in a victim block is erased by a garbage collection, an erase count of the victim block may be increased.

The read count data may be information about the number of times read requests have been transmitted to a memory block included in the memory device 100. For example, in the case where a read operation is performed on the memory block in response to a request from the host or by a background operation, the read count may be increased. The read count data may be used for an operation such as a read reclaim operation which is performed based on a read count.

The hot/cold metadata may indicate whether stored data is hot data or cold data. For example, the hot/cold metadata may be managed by at least recently used (LRU) algorithm FIG. 12 is a diagram for describing the memory device 100 in accordance with an embodiment of the present disclosure.

Figure 12:
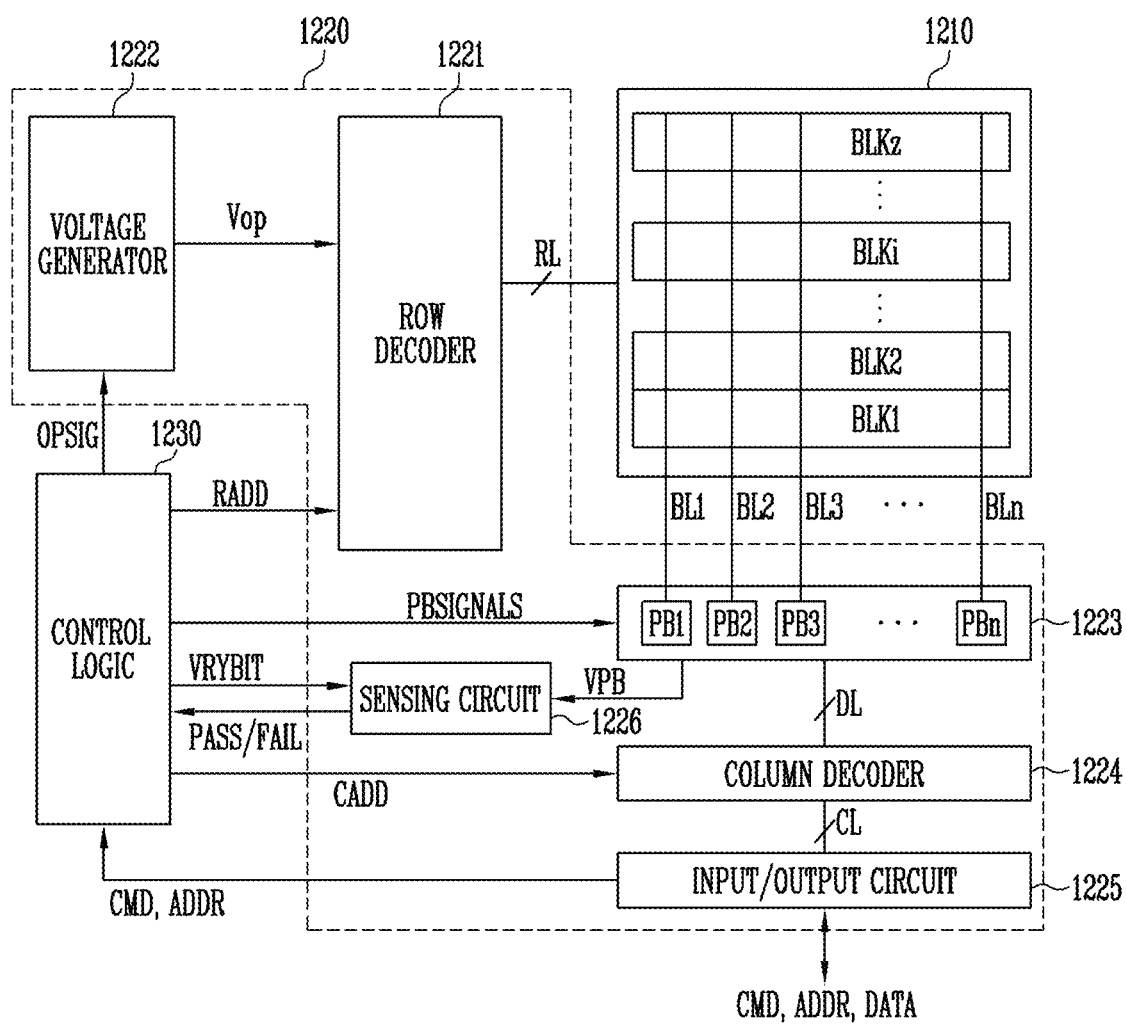
FIG. 12 is an example of a diagram showing a memory device in accordance with an embodiment of the disclosed technology.

Referring to FIG. 12, the memory device 100 may include a memory cell array 1210, a peripheral circuit 1220, and a control logic 1230.

The memory cell array 1210 may include a plurality of memory blocks BLK1 to BLKz. The plurality of memory blocks BLK1 to BLKz are coupled to a row decoder 1221 through row lines RL. The plurality of memory blocks BLK1 to BLKz may be coupled to a page buffer group 1223 through bit lines BL1 to BLn. Each of the memory blocks BLK1 to BLKz may include a plurality of memory cells. In an embodiment, the plurality of memory cells may be nonvolatile memory cells. Memory cells coupled to the same word line may be defined as one page. Hence, each memory block may include a plurality of pages.

The row lines RL may include at least one source select line, a plurality of word lines, and at least one drain select line.

Each of the memory cells included in the memory cell array 1210 may be formed of a single-level cell (SLC) capable of storing a single data bit, a multi-level cell (MLC) capable of storing two data bits, a triple-level cell (TLC) capable of storing three data bits, or a quad-level cell (QLC) capable of storing four data bits.

The peripheral circuit 1220 may perform a program operation, a read operation, or an erase operation on a selected area of the memory cell array 1210 under control of the control logic 1230. The peripheral circuit 1220 may drive the memory cell array 1210. For example, the peripheral circuit 1220 may apply various operating voltages to the row lines RL and the bit lines BL1 to BLn or discharge the applied voltages, under control of the control logic 1230.

The peripheral circuit 1220 may include the row decoder 1221, a voltage generator 1222, the page buffer group 1223, a column decoder 1224, and an input/output circuit 1225.

The row decoder 1221 is coupled to the memory cell array 1210 through the row lines RL. The row lines RL may include at least one source select line, a plurality of word lines, and at least one drain select line. In an embodiment, the word lines may include normal word lines and dummy word lines. In an embodiment, the row lines RL may further include a pipe select line.

The row decoder 1221 may operate under control of the control logic 1230. The row decoder 1221 may receive a row address ADDR from the control logic 1230.

The row decoder 1221 may decode the row address RADD. The row decoder 1221 may select at least one memory block of the memory blocks BLK1 to BLKz in response to the decoded address. The row decoder 1221 may select at least one word line WL of the selected memory block in response to the decoded address so that voltages generated from the voltage generator 1222 are applied to the at least one word line WL.

For example, during a program operation, the row decoder 1221 may apply a program voltage to a selected word line and apply a program pass voltage having a level lower than that of the program voltage to unselected word lines. During a program verify operation, the row decoder 1221 may apply a verify voltage to a selected word line and apply a verify pass voltage higher than the verify voltage to unselected word lines. During a read operation, the row decoder 1221 may apply a read voltage to a selected word line and apply a read pass voltage higher than the read voltage to unselected word lines.

In an embodiment, an erase operation of the memory device 100 may be performed on a memory block basis. During an erase operation, the row decoder 1221 may select one memory block in response to a decoded address. During the erase operation, the row decoder 1221 may apply a ground voltage to word lines coupled to the selected memory block.

The voltage generator 1222 may operate under control of the control logic 1230. The voltage generator 1222 may generate a plurality of voltages using an external supply voltage supplied to the memory device 100. For example, the voltage generator 1222 may generate various operating voltages Vop to be used for a program operation, a read operation, and an erase operation in response to an operating signal OPSIG. For example, the voltage generator 1222 may generate a program voltage, a verify voltage, a pass voltage, a read voltage, an erase voltage, and so forth under control of the control logic 1230.

In an embodiment, the voltage generator 1222 may generate an internal supply voltage by regulating the external supply voltage. The internal supply voltage generated from the voltage generator 1222 may be used as an operating voltage of the memory device 100.

In an embodiment, the voltage generator 1222 may generate a plurality of voltages using an external power supply voltage or an internal power supply voltage.

For example, the voltage generator 1222 may include a plurality of pumping capacitors for receiving the internal supply voltage and generate a plurality of voltages by selectively activating the plurality of pumping capacitors under control of the control logic 1230.

The generated voltages may be supplied to the memory cell array 1210 by the row decoder 1221.

The page buffer group 1223 may include first to n-th page buffers PB1 to PBn. The first to n-th page buffers PB1 to PBn are coupled to the memory cell array 1210 through the first to n-th bit lines BL1 to BLn, respectively. The first to n-th page buffers PB1 to PBn may operate under control of the control logic 1230. For example, the first to n-th page buffers PB1 to PBn may operate in response to page buffer control signals PBSIGNALS. For instance, the first to n-th page buffers PB1 to PBn may temporarily store data received through the first to n-th bit lines BL1 to BLn, or sense voltages or currents of the first to n-th bit lines BL1 to BLn during a read operation or a verify operation.

For example, during a program operation, the first to n-th page buffers PB1 to PBn may transmit data DATA received through the data input/output circuit 1225 to selected memory cells through the first to n-th bit lines BL1 to BLn when a program pulse is applied to a selected word line.

The memory cells in the selected page are programmed based on the transmitted data DATA. A memory cell coupled to a bit line to which a program enable voltage (e.g. a ground voltage) is applied may have an increased threshold voltage. The threshold voltage of a memory cell coupled to a bit line to which a program inhibit voltage (for example, a supply voltage) is applied may be retained. During a program verify operation, the first to n-th page buffers PB1 to PBn may read page data from selected memory cells through the first to n-th bit lines BL1 to BLn.

During a read operation, the first to n-th page buffers PB1 to PBn may read data DATA from memory cells of a selected page through the first to n-th bit lines BL1 to BLn, and output the read data DATA to the data input/output circuit 1224 under control of the column decoder 1225.

During an erase operation, the first to n-th page buffers PB1 to PBn may float the first to n-th bit lines BL1 to BLn.

The column decoder 1224 may transmit data between the input/output circuit 1225 and the page buffer group 1223 in response to a column address CADD. For example, the column decoder 1224 may exchange data with the first to n-th page buffers PB1 to PBn through data lines DL or exchange data with the input/output circuit 1225 through column lines CL.

The input/output circuit 1225 may transmit, to the control logic 1230, a command CMD or an address ADDR received from the memory controller 200 described with reference to FIG. 1, or may exchange data DATA with the column decoder 1224.

During a read operation or a verify operation, the sensing circuit 1226 may generate a reference current in response to an enable bit signal VRYBIT, and may compare a sensing voltage VPB received from the page buffer group 1223 with a reference voltage generated by the reference current and output a pass signal PASS or a fail signal FAIL.

The control logic 130 may output an operating signal OPSIG, a row address RADD, page buffer control signals PBSIGNALS, and an enable bit signal VRYBIT in response to a command CMD and an address ADD, and thus control the peripheral circuit 1220. In addition, the control logic 1230 may determine whether a target memory cell has passed a verification during a verify operation in response to a pass signal PASS or a fail signal FAIL.

Figure 13:
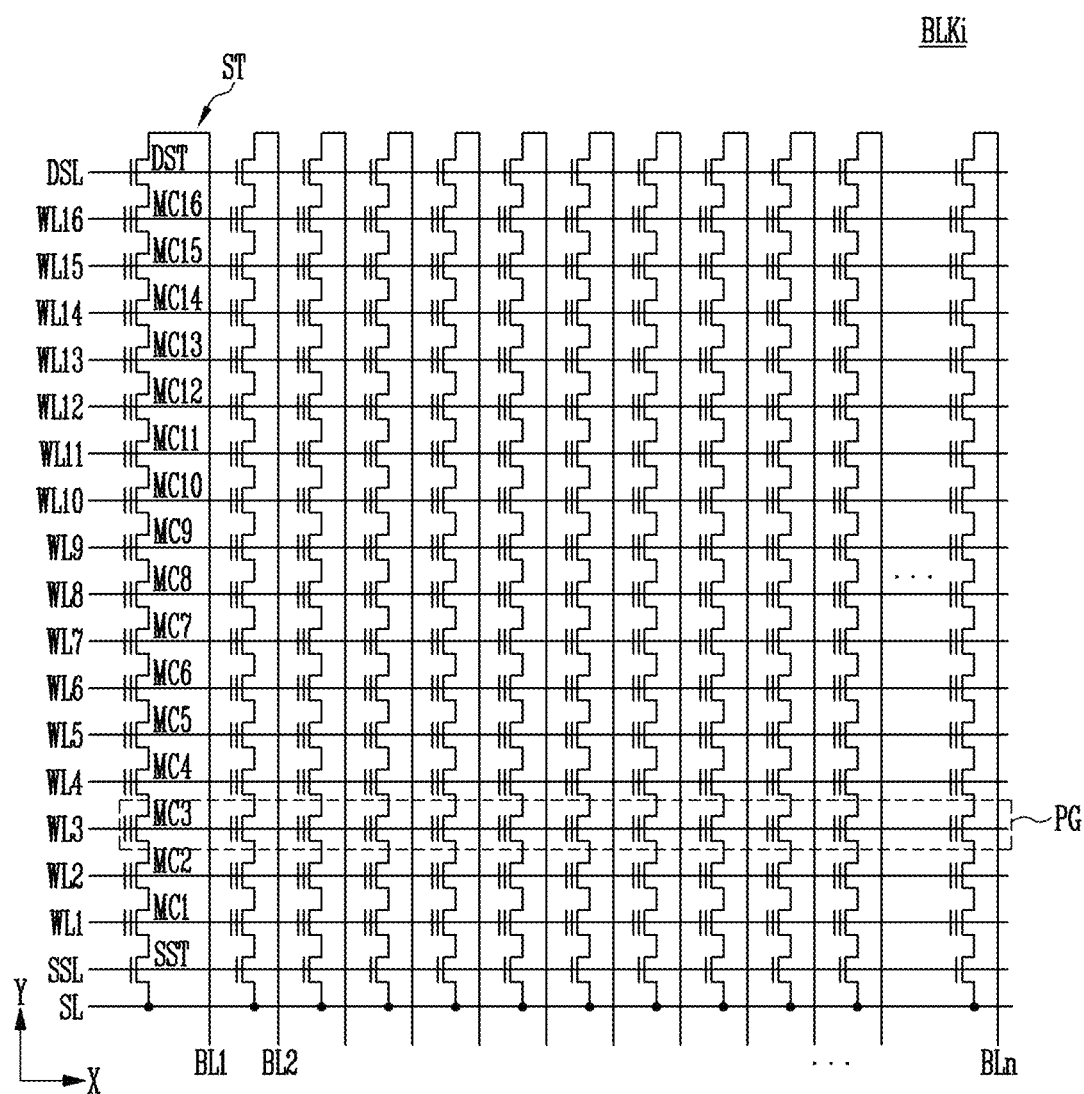
FIG. 13 is an example of a diagram showing a memory block BLKi of FIG. 12.

FIG. 13 is a diagram for describing a memory block BLKi of FIG. 12.

Referring to FIG. 13, in the memory block BLKi, a plurality of word lines arranged parallel to each other may be coupled between a first select line and a second select line. Here, the first select line may be a source select line SSL, and the second select line may be a drain select line DSL. In more detail, the memory block BLKi may include a plurality of strings ST coupled between the bit lines BL1 to BLn and the source line SL. The bit lines BL1 to BLn may be respectively coupled to the strings ST, and the source lines SL may be coupled in common to the strings ST. The strings ST may have the same configuration; therefore, the string ST that is coupled to the first bit line BL1 will be described in detail by way of example.

The string ST may include a source select transistor SST, a plurality of memory cells MC1 to MC16, and a drain select transistor DST which are coupled in series to each other between the source line SL and the first bit line BL1. At least one source select transistor SST and at least one drain select transistor DST may be included in each string ST, and a larger number of memory cells than the number of memory cells MC1 to MC16 shown in the drawing may be included in each string ST.

A source of the source select transistor SST may be coupled to the source line SL, and a drain of the drain select transistor DST may be coupled to the first bit line BL1. The memory cells MC1 to MC16 may be coupled in series between the source select transistor SST and the drain select transistor DST. Gates of the source select transistors SST included in different strings ST may be coupled to the source select line SSL, gates of the drain select transistors DST may be coupled to the drain select line DSL, and gates of the memory cells MC1 to MC16 may be coupled to the plurality of word lines WL1 to WL16. Among the memory cells included in different strings ST, a group of memory cells coupled to each word line may be referred to as a physical page PG. Therefore, the number of physical pages PG included in the memory block BLKi may correspond to the number of word lines WL1 to WL16.

Each memory cell may store 1-bit data. This memory cell is typically called a single level cell (SLC). In this case, each physical page PG may store one logical page (LPG) of data. One logical page (LPG) of data may include data bits corresponding to the number of cells included in a single physical page PG. Furthermore, each memory cell may store two- or more-bit data. In this case, each physical page PG may store two or more LPGs of data.

Figure 14:
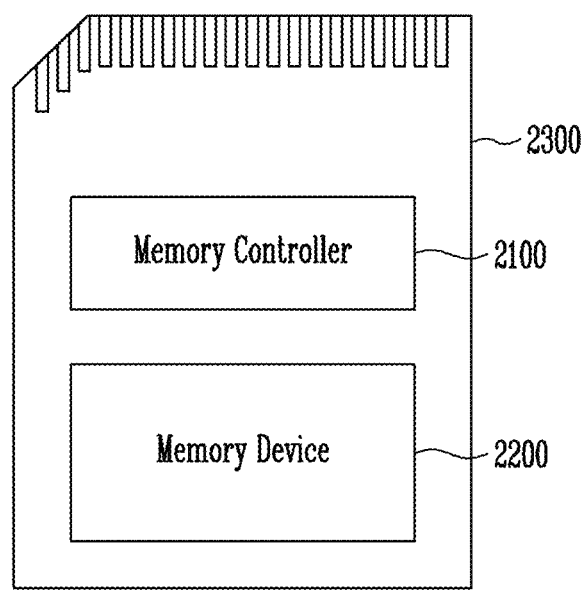
FIG. 14 is an example of a block diagram illustrating a memory card system to which a storage device in accordance with an embodiment of the disclosed technology is applied.

FIG. 14 is a block diagram illustrating a memory card system 2000 to which the storage device in accordance with an embodiment of the present disclosure is applied.

Referring FIG. 14, the memory card system 2000 may include a memory controller 2100, a memory device 2200 and a connector 2300.

The memory controller 2100 is coupled to the memory device 2200. The memory controller 2100 may access the memory device 2200. For example, the memory controller 2100 may control a read operation, a write operation, an erase operation, and a background operation of the memory device 2200. The memory controller 2100 may provide an interface between the memory device 2200 and the host. The memory controller 2100 may drive firmware for controlling the memory device 2200. The memory controller 2100 may be embodied in the same manner as that of the memory controller 200 described with reference to FIG. 1.

In an embodiment, the memory controller 2100 may include components such as a random access memory (RAM), a processing unit, a host interface, and a memory interface, and an ECC circuit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication protocols such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) protocols. In an embodiment, the connector 2300 may be defined by at least one of the above-described various communication protocols.

In an embodiment, the memory device 2200 may be implemented as any of various nonvolatile memory devices, such as an electrically erasable and programmable ROM (EEPROM), a NAND flash memory, a NOR flash memory, a phase-change RAM (PRAM), a resistive RAM (ReRAM), a ferroelectric RAM (FRAM), and a spin-torque magnetic RAM (STT-M RAM).

In an embodiment, the memory controller 2100 and the memory device 2200 may be integrated into a single semiconductor device to form a memory card. For example, the memory controller 2100 and the memory device 2200 may be integrated into a single semiconductor device to form a memory card such as a personal computer memory card international association (PCMCIA), a compact flash card (CF), a smart media card (SM or SMC), a memory stick, a multimedia card (MMC, RS-MMC, or MMCmicro), a SD card (SD, miniSD, microSD, or SDHC), or a universal flash storage (UFS).

Figure 15:
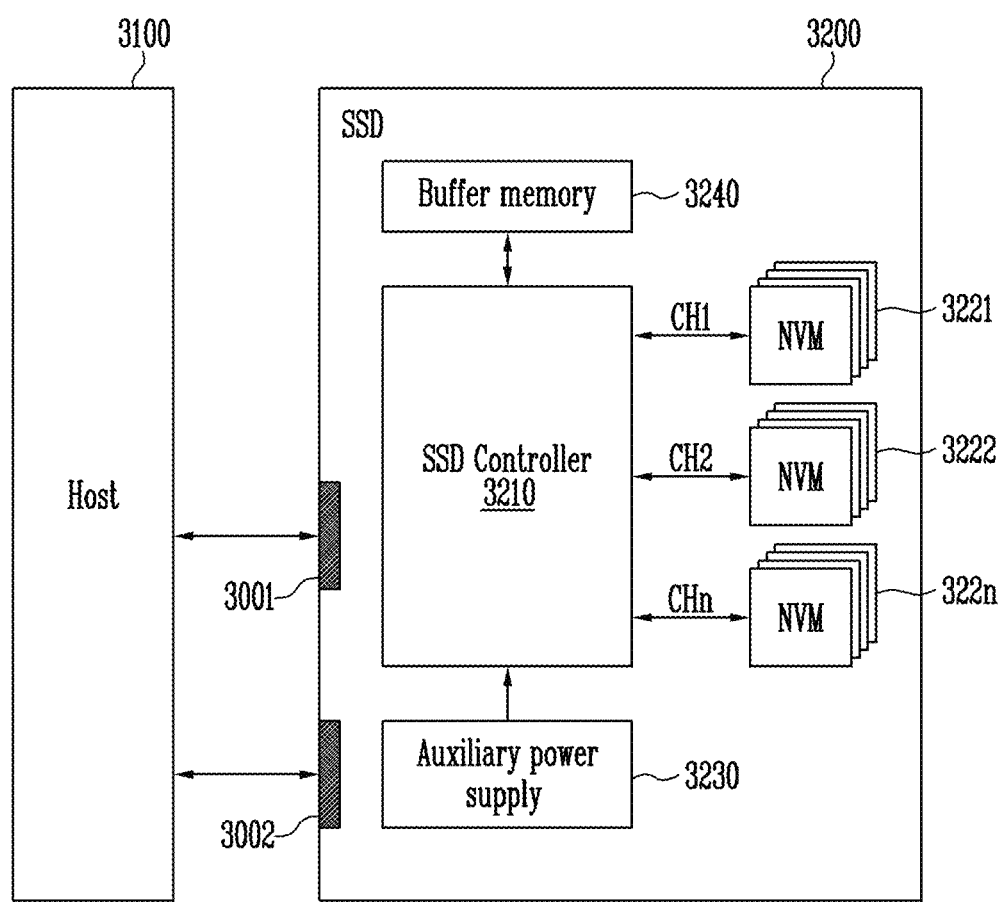
FIG. 15 is an example of a block diagram illustrating a solid state drive (SSD) system to which a storage device in accordance with an embodiment of the disclosed technology is applied.

FIG. 15 is a block diagram illustrating a solid state drive (SSD) system to which the storage device in accordance with an embodiment of the present disclosure is applied.

Referring to FIG. 15, the SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of flash memories 3221 to 322n, an auxiliary power supply 3230, and a buffer memory 3240.

In an embodiment, the SSD controller 3210 may perform the function of the memory controller 200, described above with reference to FIG. 1.

The SSD controller 3210 may control the plurality of flash memories 3221 to 322n in response to the signals SIG received from the host 3100. In an embodiment, the signals SIG may be signals based on an interface between the host 3100 and the SSD 3200. For example, the signals SIG may be signals defined by at least one of various interfaces such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100, and may be charged by the power PWR. The auxiliary power supply 3230 may supply the power of the SSD 3200 when the supply of power from the host 3100 is not smoothly performed. In an embodiment, the auxiliary power supply 3230 may be positioned inside the SSD 3200 or positioned outside the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322n or may temporarily store metadata and map data of the flash memories 3221 to 322n. The buffer memory 3240 may include volatile memories such as a DRAM, an SDRAM, a DDR SDRAM, an LPDDR SDRAM, and a GRAM or nonvolatile memories such as an FRAM, a ReRAM, an STT-MRAM, and a PRAM.

FIG. 16 is a block diagram illustrating a user system to which the storage device in accordance with an embodiment of the present disclosure is applied.

Referring to FIG. 16, the user system 4000 may include an application processor 4100, a memory module 4200, a network module 4300, a storage module 4400, and a user interface 4500.

The application processor 4100 may run components included in the user system 4000, an operating system (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory, or a cache memory of the user system 4000. The memory module 4200 may include a volatile RAM such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a nonvolatile RAM such as a PRAM, a ReRAM, an MRAM, and an FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as code division multiple access (CDMA), global system for mobile communication (GSM), wideband CDMA (WCDMA), CDMA-2000, time division multiple access (TDMA), long term evolution (LTE), WiMAX, WLAN, UWB, Bluetooth, or Wi-Fi communication. In an embodiment, the network module 4300 may be included in the application processor 4100.

The storage module 4400 may store data therein. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a phase-change RAM (PRAM), a magnetic RAM (MRAM), a resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 4000.

In an embodiment, the storage module 4400 may include a plurality of nonvolatile memory devices, and each of the plurality of nonvolatile memory devices may be operated in the same manner as that of the memory device 100 described above with reference to FIG. 1. The storage module 4400 may be operated in the same manner as that of the storage device 50 described above with reference to FIG. 1.

The user interface 4500 may include interfaces for inputting data or instructions to the application processor 4100 or outputting data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as an a liquid crystal display (LCD), an organic light emitting diode (OLED) display device, an active matrix OLED (AMOLED) display device, an LED, a speaker, and a monitor.

In a memory controller and a method of operating the memory controller in accordance with an embodiment, update version between metadata chunks may be managed by backing up and restoring metadata chunks.

In a memory controller and a method of operating the memory controller in accordance with an embodiment, even when an event in which storing data in the memory device 100 is inhibited occurs, an operation corresponding to a request from the host or a background operation may be normally performed by managing the update version between the metadata chunks.

A memory controller and a method of operating the memory controller in accordance with an embodiment of the present disclosure may provide improved metadata management performance.

Examples of embodiments have been disclosed herein, and features, characteristics, and/or elements described in connection with a particular embodiment may be used singly or in combination with features, characteristics, and/or elements described in connection with other embodiments. Various changes may be made based on the present disclosure.

What is claimed is:

1. A memory controller configured to control a memory device, the memory controller comprising:
a metadata storage configured to store a first metadata segment and a second metadata segment;
a metadata updater communicatively coupled to the metadata storage and configured to transmit an indication to update the first metadata segment and update the first metadata segment stored in the metadata storage to an updated first metadata segment;
a metadata backup circuit configured to receive from the metadata updater the indication and control copying of the first metadata segment in response to the indication;
a backup data storage communicatively coupled to the metadata backup circuit and configured to store the first metadata segment based on the indication; and
a metadata restorer configured to generate storage inhibit information indicating that storing data in the memory device is inhibited, and replace the updated first metadata segment stored in the backup data storage with the first metadata segment in response to the storage inhibit information,
wherein each of the first metadata segment and the second metadata segment includes either first map data indicating a position at which map data is stored in the memory device or second map data indicating a position at which the first map data is stored in the memory device, and
wherein the map data indicates a relationship between physical addresses of memory cells included in the memory device and logical addresses received from a host.

2. The memory controller according to claim 1, wherein the metadata updater is configured to update the second metadata segment after updating the first metadata segment based on the updated first metadata segment.

3. The memory controller according to claim 1, wherein the metadata updater is configured to suspend an update of the second metadata segment in response to the storage inhibit information.

4. The memory controller according to claim 1, wherein the metadata updater is configured to sequentially update the first metadata segment and the second metadata segment based on the map data.

5. The memory controller according to claim 4, wherein each of the first metadata segment and the second metadata segment includes at least one of i) valid page information indicating whether data stored in pages included in a memory block included in the memory device is valid, ii) valid page count information indicating a number of valid pages included in the memory block, iii) group block address information indicating physical addresses of memory blocks that form a super block, iv) read count information on a number of read requests requested to a memory block, v) erase count information on a number of times that erase operations have been performed on the memory block included in the memory device, or vi) hot/ cold metadata information indicating whether stored data is hot data or cold data.

6. The memory controller according to claim 1, wherein the metadata restorer is configured to generate storage inhibit information based on a residual storage capacity of the memory device.

7. The memory controller according to claim 1, wherein the backup data storage is configured to store the first metadata after the metadata updater updates the first metadata segment to the updated first metadata segment.

8. The memory controller according to claim 1, wherein the metadata restorer is configured to generate the storage inhibit information in a case that a capacity of the memory device to store data is equal to or less than a reference value.

9. The memory controller according to claim 1, wherein the metadata restorer is configured to generate the storage inhibit information in a case that the memory device is used only for a read operation.

10. A method of operating a memory controller which includes a metadata storage configured to store a first metadata segment and a second metadata segment, and a backup data storage configured to store backup data of at least one of the first metadata segment or the second metadata segment, the method comprising:
    storing, in response to a selection of the first metadata segment as being updated, the first metadata segment in the backup data storage;
    updating the first metadata segment to an updated first metadata segment such that the metadata storage stores the updated first metadata segment instead of the first metadata segment; and
    replacing, in response to storage inhibit information indicating that storing data in the memory device is inhibited, the updated first metadata segment stored in the metadata storage with the first metadata segment,
    wherein each of the first metadata segment and the second metadata segment includes either first map data indicating a position at which map data is stored in the memory device or second map data indicating a position at which the first map data is stored in the memory device, and
    wherein the map data indicates a relationship between physical addresses of memory cells included in the memory device and logical addresses received from a host.

11. The method according to claim 10, wherein the updating of the first metadata segment is performed based on the map data.

12. The method according to claim 10, further comprising: updating the second metadata segment based on the updated first metadata segment.

13. The method according to claim 10, wherein each of the first metadata segment and the second metadata segment includes at least one of i) valid page information indicating whether data stored in pages included in a memory block included in the memory device is valid, ii) valid page count information indicating a number of valid pages included in the memory block, iii) group block address information indicating physical addresses of memory blocks that form a super block, iv) read count information on a number of read requests requested to a memory block included in the memory device, v) erase count information on a number of times that erase operations have been performed on the memory block, or vi) hot/cold metadata information indicating whether stored data is hot data or cold data.

14. The method according to claim 10, further comprising suspending updating of the second metadata segment in response to the storage inhibit information.

15. The method according to claim 10, further comprising generating the storage inhibit information for inhibiting storing data in the memory device based on a residual storage capacity of the memory device.

16. The method according to claim 10, further comprising generating the storage inhibit information upon detecting that a capacity of the memory device to store data is equal to or less than a reference value.

17. A memory controller comprising:
    a metadata storage configured to store a plurality of metadata segments; and
    a metadata restorer configured to back up a selected target segment to be updated among the plurality of metadata segments before the target segment is updated to an updated target segment, and restore the selected target segment instead of the updated target segment in the metadata storage based on a residual storage capacity of the memory device,
    wherein each of the plurality of metadata segments includes either first map data indicating a position at which map data is stored in the memory device or second map data indicating a position at which the first map data is stored in the memory device, and
    wherein the map data indicates a relationship between physical addresses of memory cells included in the memory device and logical addresses received from a host.

18. The memory controller according to claim 17, wherein the metadata restorer comprises:
    a metadata backup circuit configured to back up the target segment before the target segment is updated; and
    a metadata restorer configured to generate storage inhibit information indicating that storing data in the memory device is inhibited based on the residual storage capacity of the memory device, and restore the selected target segment in response to the storage inhibit information.

* * * * *